(12) United States Patent
Hillier et al.

(10) Patent No.: US 11,721,220 B2
(45) Date of Patent: Aug. 8, 2023

(54) SYSTEMS AND METHODS FOR MONITORING AND IDENTIFYING FAILURE IN DUAL FLIGHT MANAGEMENT SYSTEMS

(71) Applicant: Honeywell International Inc., Morris Plains, NJ (US)

(72) Inventors: John Hillier, Phoenix, AZ (US); Daniel E. Lewis, Morris Plains, NJ (US); Baptiste Duffourd, Beaupuy (FR)

(73) Assignee: Honeywell International Inc., Charlotte, NC (US)

( * ) Notice: Subject to any disclaimer, the term of this patent is extended or adjusted under 35 U.S.C. 154(b) by 113 days.

(21) Appl. No.: 16/838,110

(22) Filed: Apr. 2, 2020

(65) Prior Publication Data
US 2020/0320884 A1    Oct. 8, 2020

Related U.S. Application Data

(60) Provisional application No. 62/828,946, filed on Apr. 3, 2019.

(51) Int. Cl.
*G08G 5/00*    (2006.01)
*B64D 45/00*   (2006.01)

(52) U.S. Cl.
CPC ............. *G08G 5/003* (2013.01); *B64D 45/00* (2013.01); *G08G 5/0004* (2013.01); *G08G 5/0047* (2013.01); *B64D 2045/0085* (2013.01)

(58) Field of Classification Search
CPC .... G05D 1/0077; G05D 1/101; G08G 5/0047; G08G 5/003; G08G 5/0034; B64C 13/18; G01C 23/005
See application file for complete search history.

(56) References Cited

U.S. PATENT DOCUMENTS

| 2013/0184899 A1* | 7/2013 | Raynaud | G05D 1/0077 |
| | | | 701/3 |
| 2014/0019038 A1* | 1/2014 | Shehi | G01C 23/00 |
| | | | 701/417 |
| 2016/0147224 A1* | 5/2016 | Roger | G08G 5/0047 |
| | | | 701/3 |

(Continued)

*Primary Examiner* — Maceeh Anwari
*Assistant Examiner* — Aarron E Santos
(74) *Attorney, Agent, or Firm* — Bookoff McAndrews, PLLC

(57) ABSTRACT

Systems and methods may be used for monitoring and identifying failure in flight management systems. For example, a method may include: calculating, using a first flight management system, a first value of a guidance command for controlling an aircraft for an RNP AP procedure; receiving a second value of the guidance command from a second flight management system; comparing the first value with the second value to determine whether the first value matches the second value; upon determining that the first value does not match the second value, using a flight management system monitor to determine, from the first flight management system and the second flight management system, a flight management system that has computed a correct value of the guidance command; and generating a message indicating that the determined flight management system is to be used to guide the aircraft.

20 Claims, 5 Drawing Sheets

(56) References Cited

U.S. PATENT DOCUMENTS

| | | | |
|---|---|---|---|
| 2016/0171897 A1* | 6/2016 | Mere | B64C 13/18 |
| | | | 701/3 |
| 2017/0148331 A1* | 5/2017 | Raynaud | G05D 1/0077 |
| 2018/0275655 A1* | 9/2018 | Raynaud | G08G 5/0047 |

* cited by examiner

SYSTEMS AND METHODS FOR MONITORING AND IDENTIFYING FAILURE IN DUAL FLIGHT MANAGEMENT SYSTEMS

CROSS-REFERENCE TO RELATED APPLICATION(S)

This application claims the benefit of priority to U.S. Provisional Application No. 62/828,946, filed Apr. 3, 2019, which is hereby incorporated by reference in its entirety.

TECHNICAL FIELD

Various embodiments of the present disclosure relate generally to monitoring and identifying failure in flight management systems of aircraft, and, more particularly, to monitoring and identifying failure in dual flight management systems used for required navigation performance authorization required (RNP AR) procedures.

BACKGROUND

For required navigation performance authorization required (RNP AR) procedures performed using a dual flight management system, there is a need to establish a certain containment integrity and to ensure containment during failure extraction. Additionally, there is a need for the aircraft's systems to be capable of identifying or establishing a proper course of action upon detection of a failure in a flight management system.

The present disclosure is, in certain aspects, directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for monitoring and identifying failure in flight management systems.

For instance, a computer-implemented method may include: calculating, using a first flight management system, a first value of a guidance command for controlling an aircraft for an RNP AP procedure; receiving a second value of the guidance command from a second flight management system; comparing the first value with the second value to determine whether the first value matches the second value; upon determining that the first value does not match the second value, using a flight management system monitor to determine, from the first flight management system and the second flight management system, a flight management system that has computed a correct value of the guidance command; and generating a message indicating that the determined flight management system is to be used to guide the aircraft.

According to additional aspects of the disclosure, a computer system includes a memory storing instructions and one or more processors configured to execute the instructions to perform the aforementioned computer-implemented method.

According to additional aspects of the disclosure, a non-transitory computer-readable medium stores instructions that, when executed by one or more processors, cause the one or more processors to perform the aforementioned computer-implemented method or the operations that the aforementioned computer systems are configured to perform.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

As described above, there is a need for aircraft systems to be capable of identifying or establishing a proper course of action upon detection of a failure in a flight management system (FMS). As will be described below in more detail, various embodiments may utilize an FMS monitor to resolve discrepancies between two FMSs. For example, if the two FMSs are computing non-matching values for parameter, such as a roll command or other control command for guiding the aircraft, the FMS monitor may perform its own computation of the parameter, the result of which may be used to determine which of the two FMSs is correct. By determining which of the two FMSs is correct, the pilot or aircraft may take an appropriate course of action, such as using the properly functioning FMS for further guidance in the RNP AP procedure.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus.

Figure 1:
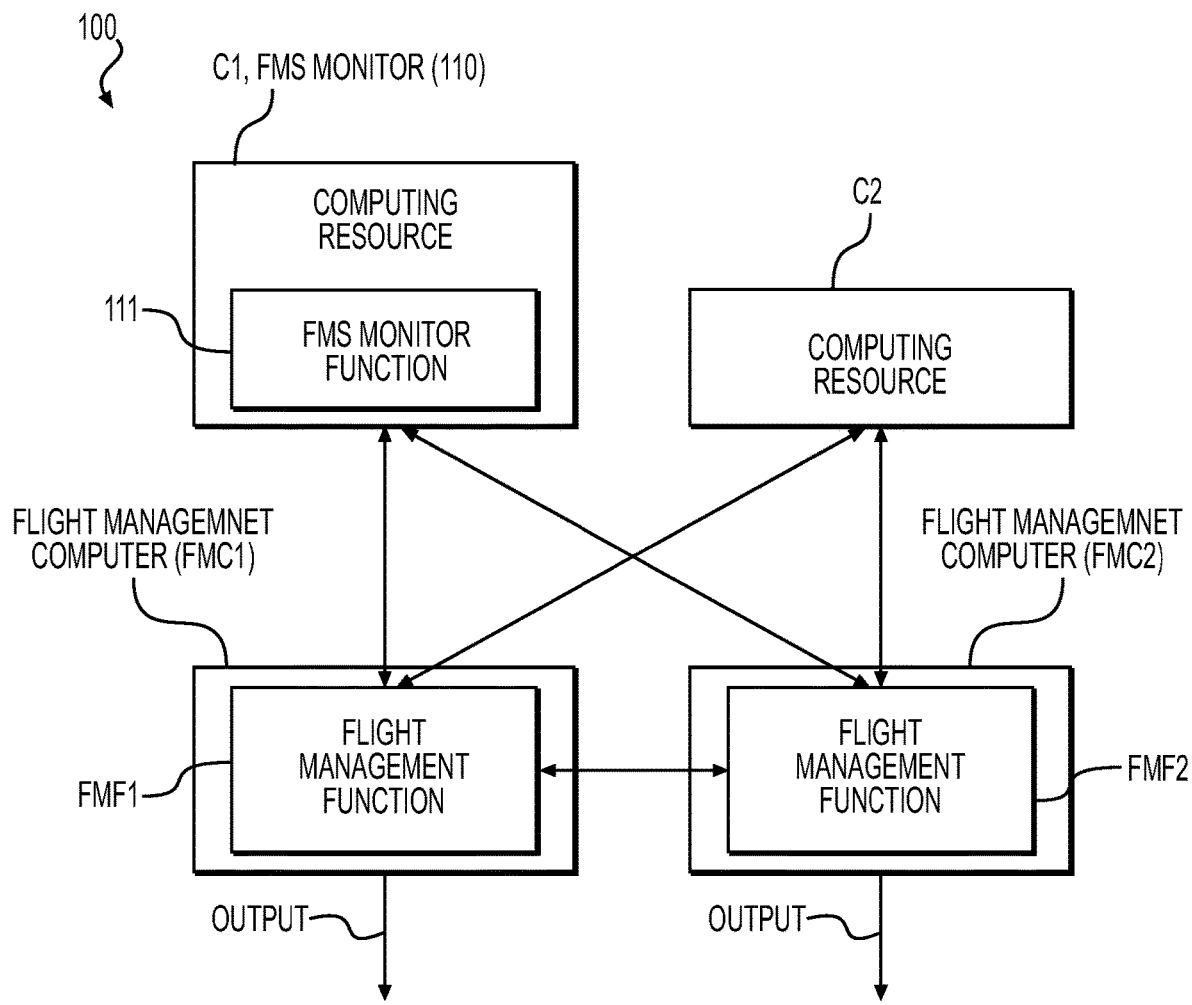
FIG. 1 illustrates a system having a dual FMS configuration, according to one or more embodiments of the present disclosure.

In the following description, embodiments will be described with reference to the accompanying drawings. FIG. 1 illustrates a system 100 having a dual FMS configuration, according to one or more embodiments of the present disclosure. The system may include a plurality of flight management functions, such as a first flight management function FMF1 and a second flight management function FMF2. In general, any flight management function of system 100 may be performed by any suitable computing device. In some embodiments, the system 100 may include a plurality of flight management computers, such as flight management computer FMC1 and flight management computer FMC2, configured to perform the plurality of flight management functions, respectively. For example, as shown in FIG. 1, flight management computers FMC1 and FMC2 may respectively perform the flight management functions FMF1 and FMF2. System 100 may be part of an avionics system of an aircraft. Such an avionics system may additionally include other components, such as position sensors. Position sensors may include any suitable position sensor, such as a global positioning system (GPS) and an inertial reference system (IRS).

System 100 may include a plurality of computing resources, such as computing resource C1 and computing resource C2. A computing resource may be, for example, any suitable computing device or computer partition. For example, a computing device may be a multi-function control and display unit (MCDU). The flight management functions FMF1 and FMF2 may be in communication with one another, and each may be in communication with computing resources C1 and C2.

Flight management computers FMC1 and FMC2 may each be part of a respective flight management system (FMS). For example, FMC1 may be part of a first FMS, and FMC2 may be a part of a second FMS. The computing resource C1 and the computing resource C2 may also be considered to be part of the first and second FMSs, respectively. As noted above, the computing resources C1 and C2 may each be an MCDU, which may serve as a display unit of an FMS. Any system that includes two FMSs, such as system 100 described herein, may be referred to as a dual FMS system.

Any functionality of an FMF (e.g., FMF 1 and FMF 2) may also be regarded as a functionality of the FMC or FMS that performs the FMF. Furthermore, as used herein, the expression "FMC/FMF" refers to an element that may be an FMC or an FMF.

In system 100, any one of the computing resources C1 and C2 may perform an FMS monitor function, in which case the computing resource that performs the FMS monitor function may be referred to as an FMS monitor. For example, as shown in FIG. 1, computing resource C1 may serve as an FMS monitor 110 configured to perform FMS monitor function 111. Any system that includes an FMS monitor in conjunction with one or more flight management computers (or one or more flight management functions) may be referred to as an FMS system.

Figure 2:
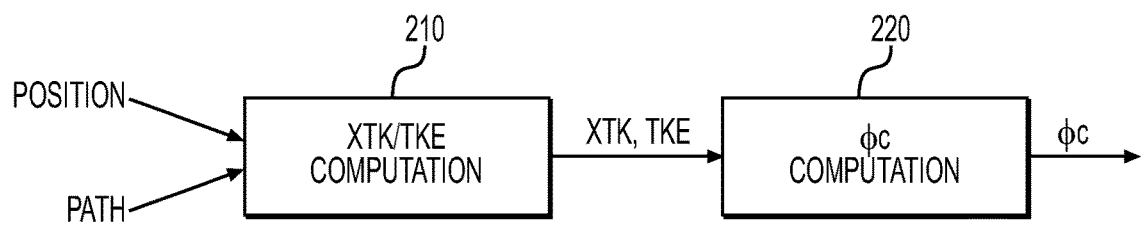
FIG. 2 illustrates a data flow process for computing a roll command $\varphi_c$, according to one or more embodiments of the present disclosure.

FIG. 2 illustrates a data flow process for computing a roll command $\Phi_c$, according to one or more embodiments of the present disclosure. The roll command may be calculated by any component described in this disclosure as having the capability of calculating a roll command. For example, the flights management computers FMC1 and FMC2 and the FMS monitor 110 may be configured to compute the roll command in accordance with the data flow shown in FIG. 2.

As shown in FIG. 2, values for position and path may be input into an XTK/TKE computation process 210. The parameter of position may include, for example, a GPS position and/or an FMS position. The parameter of path may include, for example, an active leg and/or a path definition. The XTK/TKE computation process 210 may compute a value of XTK (cross track error) as a function of input values for the parameters of position and/or path, and may compute a value of TKE (track angle error) as a function of input values for the parameters of position and/or path. The computed values of XTK and TKE may be input into a $\Phi_c$ computation process 220, which may compute $\Phi_c$ as a function of XTK and TKE.

As described above, for required navigation performance authorization required (RNP AR) procedures, there is a need to establish a certain containment integrity, such as a $10^{-1}$ containment integrity, using a dual FMS. There is a need to ensure integrity for RNP AR procedures, including containment during failure extraction. In systems having two FMCs/FMFs (e.g., FMF1 or FMC1, and FMF2 or FMC2), the FMCs/FMFs may perform a comparison of their respective independent guidance computations (e.g., respective computations of $\Phi_c$ or other parameter). By performing such a comparison, the two FMCs/FMFs may be capable of determining whether a failure has occurred to a $10^{-7}$ probability, for example. However, such a comparison does not necessarily provide an escape answer in the event of a failure. Therefore, if a failure does occur, the two FMCs/FMFs may be unable to establish the proper course of action to extract from the procedure while maintaining containment to a certain limit, such as a limit of two times the RNP value (2*RNP or 2×RNP).

Various embodiments of the present disclosure utilize an FMS monitor (e.g., FMS monitor 110) to provide a mechanism of extraction for the event of a dual FMS failure. As noted above, FMS monitor 110 may be a multi-function control and display unit (MCDU). It is understood, however, that the present disclosure is not so limited, and that the FMS monitor 110 may be a different computing device. However, a realizable benefit of the systems and methods of this disclosure is that the FMS monitor does not need to be another FMS (e.g., a third FMS in the case of a dual FMS configuration). Therefore, in some embodiments, the FMS monitor 110 may be a computing device other than an FMS or FMC.

The FMS monitor 110 may receive inputs from the GPS and IRS, as well as inputs from flight management computers FMC1 and FMC2 (or from flight management functions FMF1 and FMF2). The FMS monitor function 111 may use a flight plan path from any of the FMSs, with established integrity, to independently compute the active leg and associated guidance commands to the flight plan.

In some embodiments, these guidance commands may be used by the dual FMS system of FIG. 1 to determine which FMC or FMF has had a failure, if the two FMSs have conflicting guidance commands. In some embodiments, the FMS monitor function 111 may be not used unless the dual FMS has a mis-compare of potentially hazardous data. A mis-compare of potentially hazardous data may occur when any one of the two FMSs has determined that its guidance command does not match the guidance command of the other one of the two FMSs.

Alternatively or additionally, a different system, such as a flight guidance computer, could use the third source (e.g., the FMS monitor 110 described above) as a monitor or guidance source.

The FMS monitor function 111 may independently compute parameters such as, but not limited to, the active leg/waypoint, desired track, cross track, and/or track angle error, and may also compute an aircraft position based on data obtained by the GPS or IRS. In some embodiments, the FMS monitor function 111 may also independent compute a roll command.

The two FMCs/FMFs may use FMS monitor data to establish which FMC/FMF is incorrect if the FMCs/FMFs do not have the same guidance data (e.g., calculated values) on any one or more parameters, such as active leg and/or roll command. Alternatively or additionally, if one of the dual FMS systems has failed, the FMS monitor 110 could be used to establish containment (e.g., $10^{-7}$ containment as described above) for the remaining FMC/FMF.

If a failure is detected by either of the two FMCs/FMFs, the FMS monitor may be used to indicate which FMC/FMF is the properly operating FMC/FMF, such that the pilot (or aircraft systems) can follow guidance from the properly operating FMS. In some embodiments, the pilot reconfigures. Alternatively or additionally, the reconfiguration to use the properly operating FMC/FMF may be automatic.

Figure 3:
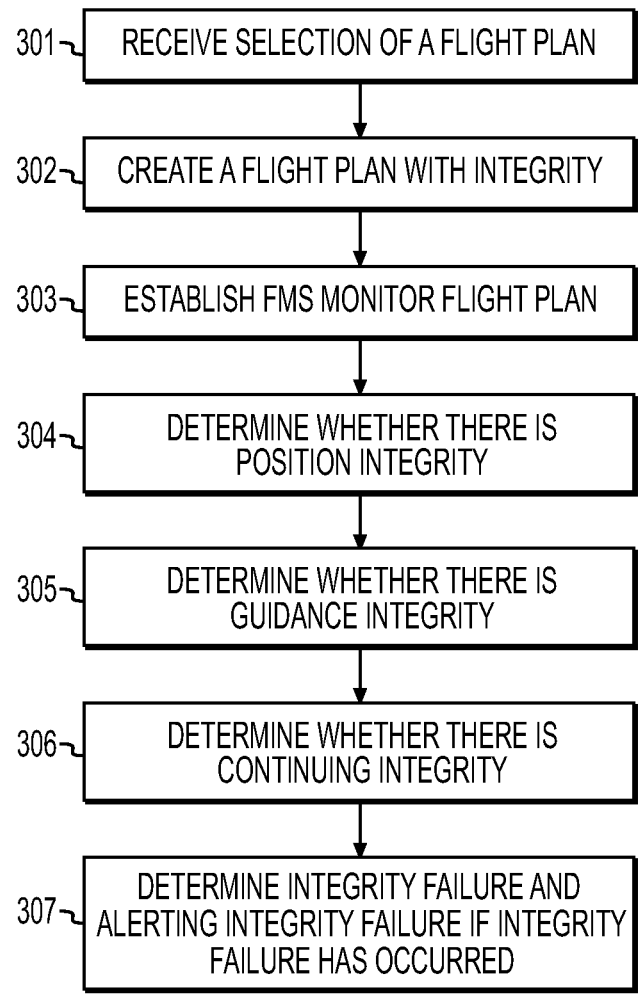
FIG. 3 illustrates a method of monitoring and identifying failure in flight management systems according to one or more embodiments of the present disclosure.

FIG. 3 illustrates a method according to one or more embodiments of the present disclosure. The steps of the method may be performed by the avionics system of an aircraft, which, as described above, may include system 100 illustrated in FIG. 1. The FMSs referred to in the following description may include the first and second FMSs respectively including flight management computers FMC1 and FMC2, as described above.

Step 301 may include receiving a selection of a flight plan. For example, a pilot may select a flight plan requiring $10^{-7}$ integrity from a navigation database of any one of the FMSs. The selection may be received by each of the FMSs.

Step 302 may include creating a flight plan with integrity. For example, each FMS may independently create a flyable representation of the flight plan. Such flyable representations may include one or more "legs" in the flight plan. For example, a flight plan may be broken down into segments of straight lines and arcs. Each FMS exchanges and compares the digital representation of the flight plan that it generated with the digital representation of the flight plan generated by the other FMS, to ensure that the same solution has been created. Accordingly, the flight plan may now be said to have integrity.

Step 303 may include establishing an FMS Monitor flight plan. In this step, each FMS may send its flight plan with integrity to the respective computing resource (e.g., a MCDU, computing device, or computer partition, as described above in relation to FIG. 1) wrapped with a cyclic redundancy check (CRC). Accordingly, each computing resource now has a flight plan with integrity. As noted above, one of the computing resources that receives a flight plan may be an FMS monitor that performs FMS monitor function 111.

Step 304 may include determining whether there is position integrity. In this step, the FMS monitor 100 and the FMSs may each ensure that it has a GPS solution with integrity, as part of a standard operation. For example, the FMS monitor 100 and the FMSs may each exchange and compare its own calculated position with the positions of the others, to determine whether there is integrity. In this context, integrity may refer to a match among all positions respectively calculated by the FMS monitor and the FMSs. FMS Monitor 110 may be used to identify failures in integrity.

Step 305 may include determining whether there is guidance integrity, also referred to as "guidance with integrity." In this step, the FMS monitor 100 and the FMSs may each compute crosstrack and track angle errors to the active leg, and compare their results with one another to determine whether there is integrity (e.g., match among all the results calculated by the FMS monitor and the FMSs). FMS monitor 110 may be used to identify failures in integrity.

Step 306 may include determining whether there is continuing integrity. In this step, the FMS monitor 100 and the FMSs may each compute when to transition between legs and segments of the flight plan, and compare their results with one another to determine whether there is integrity (e.g., a match among all the results calculated by the FMS monitor and the FMSs). FMS monitor 110 may be used to identify failures in integrity.

Step 307 may include determining integrity failure and alerting integrity failure if integrity failure has occurred. In step 306, each FMS may independently determine integrity failure, which may be based on data provided by the FMS monitor. Each FMS may, upon determining that there is integrity failure, independently provide an indication to the flight crew (e.g., pilot), or aircraft system.

If an integrity alert occurs, extraction may be performed. For example, the pilot or aircraft system may initiate a go-around using the properly functioning FMS. Containment may be to be met by the single FMS for the duration of the extraction.

Figure 4A:
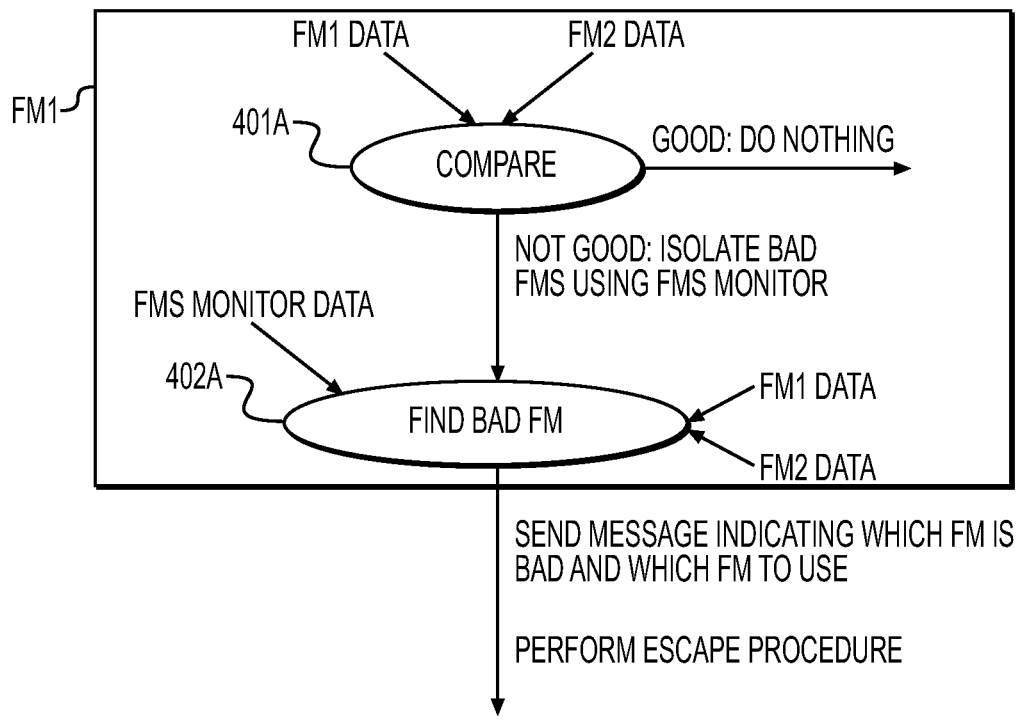
FIGS. 4A and 4B illustrate integrity logic for implementing the methodologies of the present disclosure, according to one or more embodiments of the present disclosure.
Figure 4B:
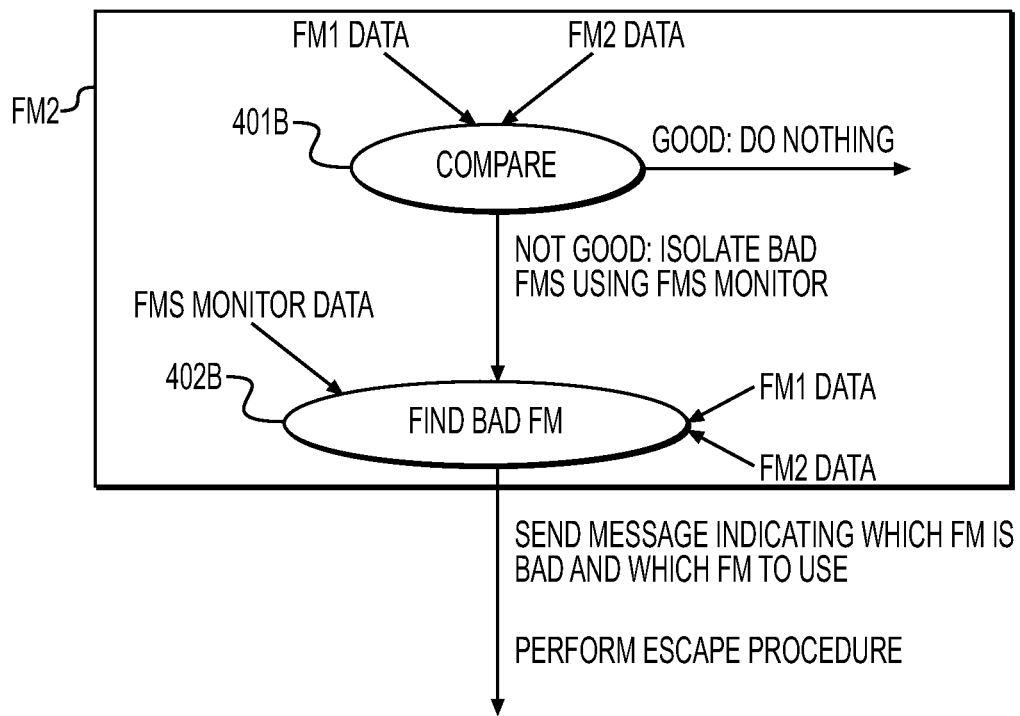

FIGS. 4A and 4B illustrate integrity logic for implementing the methodologies of the present disclosure, according to one or more embodiments of the present disclosure. As used herein, "FM1" refers to an element that is FMC1 or FMF1 of FIG. 1, "FM2" refers to an element that is FMC2 or FMF2 of FIG. 1, and "FM" is interchangeable with the aforementioned term "FMC/FMF." For example, when an operation is performed by "FM1", it is understood that the operation may be performed by either FMC1 or FMF1.

As shown in FIGS. 4A and 4B, the two FMCs/FMFs (as represented by FM1 and FM2) each receive data from the other FMC/FMF. Such data is shown in the figure as FM1 data and FM2 data, which refer to data used or generated by FM1, and data used or generate by FM2, respectively. When on a procedure requiring additional integrity, the data may be compared (operation 401A and 401B). Such data for comparison, which is represented in the figures as "FM1 data" and "FM2 data," may include parameter values for any parameter suitable for comparison for purposes of determining integrity error, such as active waypoint, crosstrack, track angle error, and/or roll command.

As shown in FIGS. 4A and 4B, if the comparison is "good" (e.g., the result of the comparison is that the compared data matches) then no action may be taken. If the comparison is "not good" (e.g., the result of the comparison is that the compared data do not match), the FMS monitor 110 may be used to indicate which one among FM1 and FM2 is "bad" (e.g., not using or computing correct data)

(operation 402A and 402B). In order to use the FMS monitor 110, one or both of FM1 and FM2 may, for example, invoke the FMS monitor 110 to perform the FMS monitor function 111, so that the FMS monitor function 111 generates FMS monitor data indicative of which FM is bad. Based on the FMS monitor data, FM1 and FM2 may determine which FM is bad. For example, based on the FMS monitor data, FM1 and FM2 may determine that one among FM1 and FM2 is computing erroneous LNAV data. Upon determining that one among FM1 and FM2 is bad, the FM making the determination may also determine that the other among FM1 and FM2 should be used, and may send a message indicating which FM is bad and/or which FM should be used. Such a message may be sent to an aircraft system or presented to the pilot or aircraft crew in the form of an alert.

In some embodiments, the FMS monitor data may include monitor-computer parameter values computed by FMS monitor 110 for purposes of comparison with parameter values included in FM1 data and FM2 data. In operations 402A and 402B, FM1 and FM2 may determine which FM is inaccurate by performing such a comparison. Alternatively or additionally, such a comparison may be performed by FMS monitor 110, and the FMS monitor data may indicate the result of such as a comparison.

In some embodiments, only AR approaches may be fully monitored by the FMS monitor 110, for purpose of simplicity, for example.

Figure 4C:
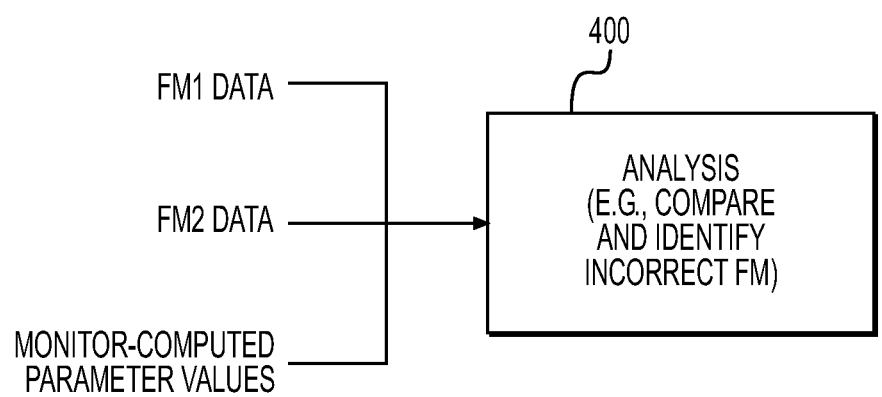
FIG. 4C illustrates an analysis operation, e.g., for comparing and identifying incorrect flight parameters, according to one or more embodiments of the present disclosure.

FIG. 4C illustrates an analysis operation 400, according to one or more embodiments of the present disclosure. The analysis operation may be performed by FMS monitor 110, particularly the FMS monitor function 111 run by the FMS monitor 110.

In general, the analysis operation 400 may determine which FM is incorrect as to one or more parameters (e.g., position, roll command, and/or active leg and path). The result of such determination may be used by the FMs to find the erroneous FM, in accordance with step 402A and step 402B, such that an FM that is not in error may be used instead of an FM that is in error. The type of parameter that is analyzed may be depend on the circumstances. For example, the analysis operation 400 may be triggered when a parameter has been determined to lack integrity in step 401A or 401B described above. It is also possible for the analysis operation 400 to be performed for a pre-configured set of parameters.

The analysis operation 400 may determine whether a position being used by an FMS is good (e.g., correct or proper). In this operation, the FMS monitor 110 may compute a GPS/IRS position based on data provided by the GPS or IRS, such GPS/IRS position being. The FMS monitor 110 may then compare the computed position, a first FMS-calculated GPS/IRS position computed by FM1, and a second FMS-calculated GPS/IRS position computed by FM1, to thereby identify which one among the three GPS/IRS positions is bad based on the comparison.

If the first FMS-calculated GPS/IRS position is bad, then the FMS monitor 100 may identify FM1 as having a position error, generate FMS monitor data indicating that FM1 has a position error, and provide the FMS monitor data to FM1 and FM2. If the second FMS-calculated GPS/IRS position is bad, then the FMS monitor 110 may identify FM2 as having a position error, generate FMS monitor data indicating that FM2 has a position error, and provide the generated FMS monitor data to FM1 and FM2. Alternatively or additionally, the comparison of the GPS/IRS positions and/or the identifying of which FM has the position error may be performed by FM1 and FM2.

The analysis operation 400 may determine whether a roll command ($\Phi_c$) generated by an FMS is good (e.g., correct or proper). In such an operation, the FMS monitor 110 may compute a $\Phi_c$ within the FMS monitor 110 (e.g., the FMS monitor may obtain input parameters and input the values of the parameters into a control law, in accordance with FIG. 2). The FMS monitor 110 may then compare the computed $\Phi_c$, a first FMS-computed $\Phi_c$ computed by FM1, and a second FMS-computed $\Phi_c$ computed by FM1, to thereby determine which one among the three $\Phi_c$ values is bad.

If the first FMS-calculated $\Phi_c$ is bad, then the FMS monitor 110 may determine that FM1 has an LNAV error, generate FMS monitor data indicating that FM1 has an LNAV error, and provide the FMS monitor data to FM1 and FM2. If the second FMS-calculated $\Phi_c$ is bad, then the FMS monitor 110 may determine that FM2 has an LNAV error, generate FMS monitor data indicating that FM2 has an LNAV error, and provide the FMS monitor data to FM1 and FM2. Alternatively or additionally, the comparison of $\Phi_c$ and/or the identifying of which FM has an LNAV error may be performed by FM1 and FM2.

The analysis operation 400 may determine whether an FMS active leg and path are correct. As described above, each FMS may sequence legs independently. The dual-confirmed active and next legs may be sent to the FMS monitor. The FMS monitor 110 may compute an ETK, TKE, and $\Phi_c$, and may sequence legs. The FMS monitor may compare the legs, sequenced by itself and received from the FMSs, to any FMS paths (e.g., bad paths received from the FMSs). If a leg received from an FMS is bad, then the FMS monitor 110 may identify the corresponding FM as having LNAV error, generate FMS monitor data indicating that the identified FM has LNAV error, and provide the FMS monitor data to FM1 and FM2. Alternatively or additionally, the comparison and/or the identifying the erroneous FM may be performed by FM1 and FM2.

When the aircraft is on an AR approach procedure, for example, each FMS may performs its own leg sequencing. The FMS monitor may determine whether active legs match. For example, in order for active legs to match, active data of the active legs must match within a certain period of time (e.g., 3 seconds). Such active data may be active data indicative of leg type and an active waypoint. If a failure is detected, the FMS monitor may perform the aforementioned operations.

Furthermore, when the aircraft is on an the AR approach procedure, path definition and guidance data may be compared by the FMS monitor. This comparison may be based on, for example, active waypoint, crosstrack, track angle error, and/or roll command.

A method for FMS integrity monitoring, according to one or more embodiments of the present disclosure, may include the steps as described below. In general, the steps of the method may be performed using any suitable technique described in this disclosure.

The method may include, for each of a plurality of FMSs: determining, using the respective FMS, value(s) for one or more parameters; and transferring, to each other FMSs of the plurality of FMSs, data indicative of the determined value(s). The one or more parameters may include a position (e.g., GPS position) of an aircraft, an active leg, an active segment, XTK, TKE, and/or a roll command. For each of the plurality of FMSs, the establishing may further establish integrity of position. The transferring of the data may result in each of the plurality of FMSs having its own set of determined value(s) for the one or more parameters, as well as the sets of determined value(s) for the one or more parameters received from every other FMS of the plurality of FMSs.

The method may further include, for each of the plurality of FMSs, determining if there is data consistency among the value(s) respectively determined by plurality of FMSs. If the respective FMS has determined that there is data consistency, then the FMS may do nothing. If the respective FMS has determined that there is data inconsistency, then the respective FMS may compare value(s) of the one or more parameters determined by an FMS monitor with the value(s) determined by each of the plurality of FMSs. Subsequently, each FMS may independent provide an alert to the pilot or an aircraft system indicating that data inconsistency was determined. The alert may further indicate at least one of the plurality of FMSs to be used for guidance.

The methodologies of the present disclosure may be suitably used for compliance with any set of regulations, and are not limited to the regulations of any specific regulatory body. For example, the European Aviation Safety Agency (EASA) and the United States FAA (Federal Aviation Administration) have different standards for RNP AR procedures. For example, EASA's requirements for RNP AR with regard to demonstration of performance in failure cases, as well as requirements on continuity of function, differ from those set forth by the FAA, such as in the FAA's advisory circular (AC). The US FAA allows aspects of RNP AR operations, such as mitigating the effects of failure conditions, to be addressed through the process of operational approval or other means, while EASA found that it is appropriate to address some of these aspects by putting more emphasis on qualification of the aircraft.

According to EASA standards: (a) lateral excursions observed as a result of probable failures are to be contained within 1×RNP; (b) lateral excursions observed as a result of OEI are to be contained within 1×RNP; and (c) Lateral excursions observed as a result of remote failures are to be contained within 2×RNP. A demonstration should be made that the aircraft remains maneuverable and a safe extraction can be flown for all extremely remote failures. Performing a safe extraction is not an acceptable means of demonstrating compliance against a, b, c, safe extraction is defined as within 2×RNP for applicable approach and missed approach procedure, and for extremely remote failures (e.g., all FMCs failed), the flight crew must be able to reasonably navigate the aircraft free of obstacles by using other navigational means to follow the missed approach procedure.

According to the methodologies described by this disclosure, a dual flight management system having an FMS monitor may be capable of identifying and establishing a proper course of action upon detection of a failure in one of the constituent flight management system. Therefore, the methodologies described by this disclosure may realize improvement in flight management system technology.

While various embodiments have been described with reference to a dual FMS system, it is understood that the methodologies described in this disclosure are applicable, in general, to systems with a plurality of FMSs, which may include more than two FMSs. Furthermore, while various embodiments have been described with referenced to a roll command, it is understood that the methodologies described in this disclosure are applicable to displacement commands in general, of which a roll command is an example.

In general, any process discussed in this disclosure that is understood to be computer-implementable may be performed by one or more processors of a computer system. System 100, computing resources C1 and C2, and flight management computers FMC1 and FMC2 and their respective flight management systems, as described above, are examples of computer systems. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system (such as a flight management system, a flight management computer, or a computing resource, as described above) may include one or more computing devices. If the one or more processors of the computer system are implemented as a plurality of processors, the plurality of processors may be included in a single computing device or distributed among a plurality of computing devices. If a computer system comprises a plurality of computing devices, the memory of the computer system may include the respective memory of each computing device of the plurality of computing devices.

Figure 5:
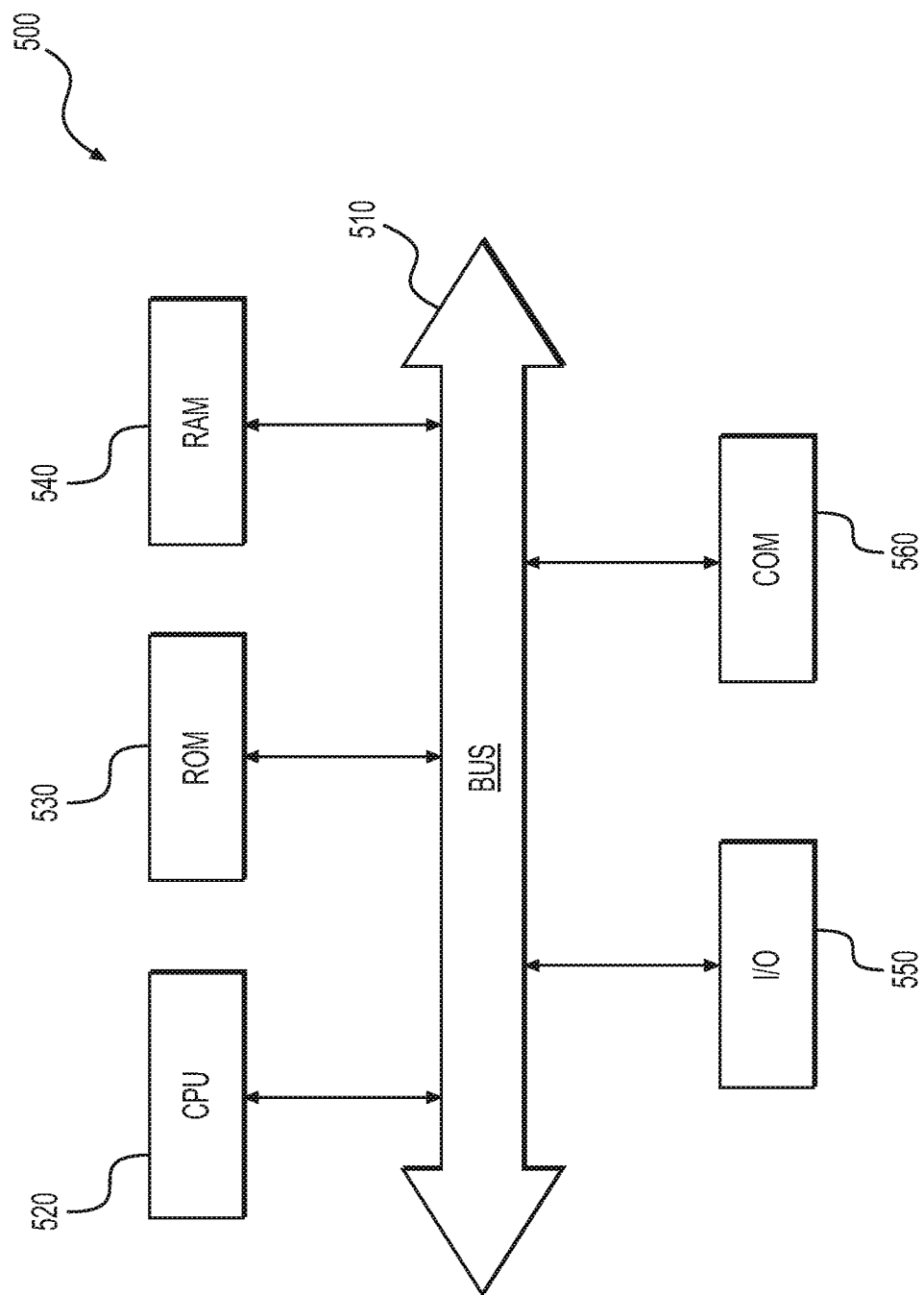
FIG. 5 illustrates an example of a computing device that may execute techniques presented herein.

FIG. 5 illustrates an example of a computing device 500 of a computer system that may execute techniques presented herein. The computing device 500 may include processor(s) 510 (e.g., CPU, GPU, or other such processing unit(s)), a memory 520, and communication interface(s) 540 (e.g., a network interface) to communicate with other devices. Memory 520 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 520. The computing device 500 may, in some embodiments, further include input device(s) 550 (e.g., a keyboard, mouse, or touchscreen) and output device(s) 560 (e.g., a display, printer). The aforementioned elements of the computing device 500 may be connected to one another through a bus 530, which represents one or more busses. In some embodiments, the processor(s) 510 of the computing device 500 include both a CPU and a GPU.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted.

What is claimed is:

1. A computer-implemented method for monitoring and identifying failure in flight management systems, the method comprising:
    receiving, from a first flight management system (FMS), a first calculated vehicle position;
    receiving, from a second FMS, a second calculated vehicle position;
    receiving, from a FMS monitor, a third calculated vehicle position;
    comparing the first calculated vehicle position with the second calculated vehicle position and the third calculated vehicle position;
    based on the comparison of the first calculated vehicle position with the second calculated vehicle position and the third calculated vehicle position, determining whether the vehicle has position integrity;
    upon determining that the vehicle has position integrity, receiving a first value of a guidance command for controlling an aircraft for a Required Navigation Authorization Required, RNP AP, procedure from the first FMS;
    receiving a second value of the guidance command for controlling the aircraft for the RNP AP procedure from a the second FMS;
    receiving a third value from the FMS monitor, wherein the first, second, and third values are at least one of calculated cross track values, track angle errors, and/or calculated timing to transition between legs and segments of a flight plan;
    comparing the first value with the second value and the third value to determine whether the first value matches the second value and third value;
    upon determining that the first value does not match the second value and third value, determining a FMS that has computed a correct value of the guidance command;
    generating a message indicating that the determined FMS is to be used to guide the aircraft; and
    automatically reconfiguring the vehicle to use the determined FMS that has computed the correct value of the guidance command.

2. The method of claim 1, wherein the cross track and track angle errors are calculated based on a position value.

3. The method of claim 1, wherein the comparing the first value with the second value and the third value further includes determining whether the first value matches the second value and third value to a predetermined degree of certainty.

4. The method of claim 3, further comprising:
    upon determining that the match of the first value, the second value, and the third value does not exceed the predetermined degree of certainty, determining that the first value does not match the second value and the third value.

5. The method of claim 3, further comprising:
    upon determining that the match of the first value, the second value, and the third value exceeds the predetermined degree of certainty, determining that the first value matches the second value and the third value.

6. The method of claim 1, wherein the flight management system monitor is a computing device other than a Flight Management System or a Flight Management Computer and wherein the guidance command is a roll command.

7. The method of claim 1, the method further comprising:
    receiving a selection of a flight plan;
    receiving, from the first FMS, a first representation of the flight plan;
    receiving, from the second FMS, a second representation of the flight plan;
    comparing the first representation of the flight plan with the second representation of the flight plan;
    based on the comparing of the first representation of the flight plan with the second representation of the flight plan, determining whether the flight plan has integrity; and
    upon determining that the flight plan has integrity and that the vehicle has position integrity, receiving the first value of a guidance command for controlling the aircraft for the Required Navigation Authorization Required, RNP AP, procedure from the first FMS.

8. A computer-implemented system for monitoring and identifying failure in flight management systems, the computer-implemented system comprising:
    a memory having processor-readable instructions stored therein: and
    at least one processor configured to access the memory and execute the processor-readable instructions, which when executed by the at least one processor configures the processor to perform a plurality of functions, including functions for:
        receiving, from a first flight management system (FMS), a first calculated vehicle position;

receiving, from a second FMS, a second calculated vehicle position;

receiving, from a FMS monitor, a third calculated vehicle position;

comparing the first calculated vehicle position with the second calculated vehicle position and the third calculated vehicle position;

based on the comparison of the first calculated vehicle position with the second calculated vehicle position and the third calculated vehicle position, determining whether the vehicle has position integrity;

upon determining that the vehicle has position integrity, receiving a first value of a guidance command for controlling an aircraft for a Required Navigation Authorization Required, RNP AP, procedure from the first FMS;

receiving a second value of the guidance command for controlling the aircraft for the RNP AP procedure from a the second FMS;

receiving a third value from the FMS monitor, wherein the first, second, and third values are at least one of calculated cross track values, track angle errors, and/or calculated timing to transition between legs and segments of a flight plan;

comparing the first value with the second value and the third value to determine whether the first value matches the second value and the third value;

upon determining that the first value does not match the second value and third value, determining a FMS that has computed a correct value of the guidance command;

generating a message indicating that the determined FMS is to be used to guide the aircraft; and automatically reconfiguring the vehicle to use the determined FMS that has computed the correct value of the guidance command.

9. The computer-implemented system of claim 8, wherein the cross track and track angle errors are calculated based on a position value.

10. The computer-implemented system of claim 8, wherein the comparing the first value with the second value and the third value further include determining whether the first value matches the second value and the third value to a predetermined degree of certainty.

11. The computer-implemented system of claim 10, the functions further comprising:
upon determining that the match of the first value, the second value, and the third value does not exceed the predetermined degree of certainty, determining that the first value does not match the second value and the third value.

12. The computer-implemented system of claim 10, the functions further comprising:
upon determining that the match of the first value, the second value, and the third value exceeds the predetermined degree of certainty, determining that the first value matches the second value and the third value.

13. The system of claim 8, wherein the flight management system monitor is a computing device other than a Flight Management System or a Flight Management Computer and wherein the guidance command is a roll command.

14. The system of claim 8, the functions further comprising:
receiving a selection of a flight plan;
receiving, from a first flight management system (FMS), a first representation of the flight plan;
receiving, from a second FMS, a second representation of the flight plan;
comparing the first representation of the flight plan with the second representation of the flight plan;
based on the comparing of the first representation of the flight plan with the second representation of the flight plan, determining whether the flight plan has integrity; and
upon determining that the flight plan has integrity and that the vehicle has position integrity, receiving the first value of a guidance command for controlling the aircraft for the Required Navigation Authorization Required, RNP AP, procedure from the first FMS.

15. A non-transitory computer-readable medium for monitoring and identifying failure in flight management systems, the non-transitory computer-readable medium storing instructions that, when executed by at least one processor, configure the at least one processor to perform:
receiving, from a first flight management system (FMS), a first calculated vehicle position;
receiving, from a second FMS, a second calculated vehicle position;
receiving, from a FMS monitor, a third calculated vehicle position;
comparing the first calculated vehicle position with the second calculated vehicle position and the third calculated vehicle position;
based on the comparison of the first calculated vehicle position with the second calculated vehicle position and the third calculated vehicle position, determining whether the vehicle has position integrity;
upon determining that the flight plan has integrity and that the vehicle has position integrity, receiving a first value of a guidance command for controlling an aircraft for a Required Navigation Authorization Required, RNP AP, procedure from the first FMS;
receiving a second value of the guidance command for controlling the aircraft for the RNP AP procedure from a the second FMS;
receiving a third value from the FMS monitor, wherein the first, second, and third values are at least one of calculated cross track values, track angle errors, and/or calculated timing to transition between legs and segments of a flight plan;
comparing the first value with the second value and the third value to determine whether the first value matches the second value and third value;
upon determining that the first value does not match the second value and third value, determining a FMS that has computed a correct value of the guidance command;
generating a message indicating that the determined FMS is to be used to guide the aircraft; and
automatically reconfiguring the vehicle to use the determined FMS that has computed the correct value of the guidance command.

16. The non-transitory computer-readable medium of claim 15, wherein the cross track and track angle errors are calculated based on a position value.

17. The non-transitory computer-readable medium of claim 15, wherein the comparing the first value with the second value and the third value further includes determining whether the first value matches the second value and third value to a predetermined degree of certainty.

18. The non-transitory computer-readable medium of claim 17, further comprising:

upon determining that the match of the first value, the second value, and the third value does not exceed the predetermined degree of certainty, determining that the first value does not match the second value and the third value; and upon determining that the match of the first value, the second value, and the third value exceeds the predetermined degree of certainty, determining that the first value matches the second value and the third value.

19. The non-transitory computer-readable medium of claim 15, wherein the flight management system monitor is a computing device other than an Flight Management System or a Flight Management Computer and wherein the guidance command is a roll command.

20. The non-transitory computer-readable medium of claim 15, further comprising:
   receiving a selection of a flight plan;
   receiving, from a first flight management system (FMS), a first representation of the flight plan;
   receiving, from a second FMS, a second representation of the flight plan;
   comparing the first representation of the flight plan with the second representation of the flight plan;
   based on the comparing of the first representation of the flight plan with the second representation of the flight plan, determining whether the flight plan has integrity; and
   upon determining that the flight plan has integrity and that the vehicle has position integrity, receiving the first value of a guidance command for controlling the aircraft for the Required Navigation Authorization Required, RNP AP, procedure from the first FMS.

* * * * *